United States Patent
Kim et al.

(10) Patent No.: US 8,665,825 B2
(45) Date of Patent: Mar. 4, 2014

(54) METHOD AND APPARATUS FOR SUPPORTING IDLE MODE HANDOVER IN HETEROGENEOUS WIRELESS COMMUNICATION

(75) Inventors: Se-Hoon Kim, Seoul (KR); Ji-Cheol Lee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 550 days.

(21) Appl. No.: 12/955,136

(22) Filed: Nov. 29, 2010

(65) Prior Publication Data
US 2011/0128936 A1 Jun. 2, 2011

(30) Foreign Application Priority Data
Nov. 27, 2009 (KR) .................. 10-2009-0115718

(51) Int. Cl.
*H04W 4/00* (2009.01)
*H04W 36/00* (2009.01)

(52) U.S. Cl.
CPC ...... *H04W 36/0016* (2013.01); *H04W 36/0005* (2013.01); *H04W 36/0011* (2013.01); *H04W 36/0033* (2013.01); *H04W 36/00* (2013.01)
USPC .......................... 370/331; 455/436

(58) Field of Classification Search
CPC ............ H04W 36/00; H04W 36/0011; H04W 36/0016; H04W 36/0033; H04W 36/0005
USPC .......................... 370/331; 455/436
See application file for complete search history.

(56) References Cited

U.S. PATENT DOCUMENTS

| 8,189,544 B2 | 5/2012 | McCann et al. |
| 2009/0175239 A1 | 7/2009 | Grinshpun et al. |

(Continued)

FOREIGN PATENT DOCUMENTS

| JP | 2006-203560 A | 8/2006 |
| JP | 2009-153042 A | 7/2009 |
| JP | 2009-542159 A | 11/2009 |

OTHER PUBLICATIONS

"Change Request form," Document Management Guidelines, Mar. 6, 2007, Revision 1.0.0, WiMAX Forum, Beaverton, Oregon.*

(Continued)

*Primary Examiner* — Ayaz Sheikh
*Assistant Examiner* — Tarell Hampton
(74) *Attorney, Agent, or Firm* — Jefferson IP Law, LLP

(57) ABSTRACT

A method for supporting an idle mode handover of an Single Radio Mobile Station (SR MS) by a target Access Service Network GateWay (ASN_GW) in a heterogeneous wireless communication system is disclosed. The method includes, upon detecting that an operation mode of the SR MS is to be changed from an idle mode to an active mode, acquiring an address of a Home Agent (HA) of the SR MS from a preregistered ASN_GW with which the SR MS has performed a preregistration operation, upon detecting that a Base Station (BS) is to set up a path with the preregistered ASN_GW, transmitting a message, including the address of the HA and requesting to set the target ASN_GW as a new Foreign Agent (FA) of the SR MS, to the preregistered ASN_GW, and upon receiving a message, requesting to register the target ASN_GW as the new FA of the SR MS, from the preregistered ASN_GW, setting up a data path with the HA, and then registering the target ASN_GW as the new FA of the SR MS.

36 Claims, 6 Drawing Sheets

(56) References Cited

U.S. PATENT DOCUMENTS

2009/0285175 A1   11/2009   Nix
2009/0290556 A1   11/2009   Taaghol
2011/0044286 A1*   2/2011   Jain ............................. 370/331

OTHER PUBLICATIONS

Gundavelli, K. Leung, V. Devarapalli, K. Chowdhury, and B. Patil "Proxy Mobile IPv6, http://tools.ietf.org/html/rfc5213" RFC 5213, Aug. 2008.*

* cited by examiner

METHOD AND APPARATUS FOR SUPPORTING IDLE MODE HANDOVER IN HETEROGENEOUS WIRELESS COMMUNICATION

PRIORITY

This application claims the benefit under 35 U.S.C. §119(a) of a Korean patent application filed in the Korean Industrial Property Office on Nov. 27, 2009, and assigned Serial No. 10-2009-0115718, the entire disclosure of which is hereby incorporated by reference.

BACKGROUND OF THE INVENTION

1. Field of the Invention

The present invention relates to an apparatus and method for supporting an idle mode handover. More particularly, the present invention relates to an apparatus and method for supporting an idle mode handover in a heterogeneous wireless communication system.

2. Description of the Related Art

A next generation wireless communication system is evolving into a system for providing Mobile Stations (MSs) with various high-speed, high-capacity services. Representative examples of the next generation wireless communication system include a Worldwide Interoperability for Microwave Access (WiMAX) wireless communication system, a Long Term Evolution (LTE) wireless communication system, and the like. Among them, the WiMAX wireless communication system is based on Institute of Electrical and Electronics Engineers (IEEE) 802.16 wireless communication systems.

As is generally known in the art, an MS can access two different wireless communication systems by being provided with two radio interface units. Here, the MS may be a dual radio MS or a single radio MS according to whether or not the two radio interface units can simultaneously transmit data. That is, when the two radio interface units can simultaneously transmit data at a specific point of time, the MS is defined as a dual radio MS. Contrarily, when only one of the two radio interface units can transmit data at a specific point of time, the MS is defined as a single radio MS. However, in the case of both the dual radio MS and the single radio MS, the two radio interface units can simultaneously receive data.

If a single radio MS that has accessed a non-WiMAX wireless communication system detects a signal from a WiMAX wireless communication system, then the single radio MS scans a WiMAX Signal Forwarding Function (SFF) unit in order to perform a handover to the WiMAX wireless communication system. Here, the non-WiMAX wireless communication system refers to any wireless communication system other than the WiMAX wireless communication system. When the single radio MS discovers the WiMAX SFF unit, it performs a preregistration operation with the WiMAX wireless communication system through the WiMAX SFF unit. Upon performing this preregistration operation, the single radio MS may be immediately handed over to the WiMAX wireless communication system, or may transition to an idle mode, and then transition later to an active mode and be handed over to the WiMAX wireless communication system. Here, the former (that is, the case where the single radio MS is handed over immediately after the preregistration operation) is referred to as an active mode handover, and the latter (that is, the case where the single radio MS is handed over later on after the preregistration operation) is referred to as an idle mode handover.

According to an idle mode handover proposed in the current WiMAX wireless communication system, when a single radio MS in an idle mode moves from a preregistered Access Service Network GateWay (ASN_GW), and performs a handover to a Base Station (BS) connected to another ASN_GW, that is, a target ASN_GW, the target ASN_GW cannot know the address of a Home Agent (HA). Here, the preregistered ASN_GW refers to an ASN_GW with which the single radio MS has performed a preregistration operation.

Since the target ASN_GW cannot know the address of an HA, as mentioned above, the target ASN_GW cannot transmit a Mobile Internet Protocol (MIP) Registration ReQuest (RRQ) message (MIP RRQ message) to the HA.

In addition, in order to change a Foreign Agent (FA) of the single radio MS from the preregistered ASN_GW to the target ASN_GW, the target ASN_GW must perform an authentication operation with a Proxy MIP (PMIP) client. However, no procedure related to the PMIP authentication operation has been proposed in the current WiMAX wireless communication system.

In this way, since the target ASN_GW can neither transmit an MIP RRQ message to the HA nor perform an authentication operation with the PMIP client, it is not presently possible for the single radio MS, which has accessed the non-WiMAX wireless communication system, to achieve an idle mode handover to the WiMAX wireless communication system.

SUMMARY OF THE INVENTION

An aspect of the present invention is to address at least the above-mentioned problems and/or disadvantages and to provide at least the advantages described below. Accordingly, an aspect of the present invention is to provide an apparatus and method for supporting an idle mode handover in a heterogeneous wireless communication system.

Another aspect of the present invention is to provide an apparatus and method for supporting a single radio Mobile Station (MS) to perform an idle mode handover from a non-Worldwide Interoperability for Microwave Access (non-WiMAX) wireless communication system to a WiMAX wireless communication system.

In accordance with an aspect of the present invention, a method for supporting an idle mode handover of a Single Radio MS (SR MS) by a target Access Service Network GateWay (ASN_GW) in a heterogeneous wireless communication system is provided. The method includes, upon detecting that an operation mode of the SR MS is to be changed from an idle mode to an active mode, acquiring an address of a Home Agent (HA) of the SR MS from a preregistered ASN_GW with which the SR MS has performed a preregistration operation, upon detecting that a Base Station (BS) is to set up a path with the preregistered ASN_GW, transmitting a message, including the address of the HA and requesting to set the target ASN_GW as a new Foreign Agent (FA) of the SR MS, to the preregistered ASN_GW, and upon receiving a message, requesting to register the target ASN_GW as the new FA of the SR MS, from the preregistered ASN_GW, setting up a data path with the HA, and then registering the target ASN_GW as the new FA of the SR MS.

In accordance with another aspect of the present invention, a method for supporting an idle mode handover of a SR MS by a preregistered ASN_GW in a heterogeneous wireless communication system is provided. The method includes, upon detecting that an operation mode of the SR MS is to be changed from an idle mode to an active mode, transmitting a message, accepting to change the operation mode of the SR MS from the idle mode to the active mode and including an address of a HA of the SR MS, to a target ASN_GW to which the SR MS is to be handed over, upon receiving a message, requesting to set the target ASN_GW as a new FA of the SR MS, from the target ASN_GW, transmitting a message, requesting to register the target ASN_GW as the new FA of the SR MS, to the target ASN_GW, and receiving a message, indicating that the target ASN_GW has been registered as the new FA of the SR MS, from the target ASN_GW.

In accordance with yet another aspect of the present invention, a method for supporting an idle mode handover of a Single Radio Mobile Station (SR MS) by a Base Station (BS) in a heterogeneous wireless communication system is provided. The method includes, upon detecting that an operation mode of the SR MS is to be changed from the idle mode to an active mode, requesting a target ASN_GW to change an operation mode of the SR MS from the idle mode to the active mode, acquiring an address of a HA of the SR MS from the target ASN_GW, setting up a path with a preregistered ASN_GW, and after setting up the path with the preregistered ASN_GW, accepting the SR MS to transition from the idle mode to the active mode, and then performing a process of updating a cipher-based message authentication code (CMAC)_KEY_COUNT with the target ASN_GW.

In accordance with still another aspect of the present invention, a method for supporting an idle mode handover of a SR MS by a target ASN_GW in a heterogeneous wireless communication system is provided. The method includes, upon receiving an Idle Mode Exit State Change Request (IM_Exit_State_Change_Req) message, indicating that an operation mode of the SR MS is to be changed from an idle mode to an active mode, from a BS, transmitting the received IM_Exit_State_Change_Req message to a preregistered ASN_GW with which the SR MS has performed a preregistration operation, receiving an Idle Mode Exit State Change Response (IM_Exit_State_Change_Rsp) message, including an address of a Home Agent (HA) of the SR MS, from the preregistered ASN_GW, transmitting the received IM_Exit_State_Change_Rsp message to the BS, and receiving a Path Registration Request (Path_Reg_Req) message, indicating that a path is to be set up with the preregistered ASN_GW, from the BS, transmitting an Anchor Data Path Function Relocation Request (Anchor_DPF_Relocate_Req) message, including the address of the HA of the SR MS and requesting to set the target ASN_GW as a new Foreign Agent (FA) of the SR MS, to the preregistered ASN_GW, receiving an FA Registration Request (FA_Register_Req) message, requesting to register the target ASN_GW as the new FA of the SR MS, from the preregistered ASN_GW, registering the target ASN_GW as the new FA of the SR MS, and then transmitting a Registration ReQuest (RRQ) message to the HA in order to set up a data path, upon receiving a Registration ResPonse (RRP) message from the HA in response to the RRQ message, setting up the path with the preregistered ASN_GW, and then transmitting an FA Registration Response (FA_Register_Rsp) message to the preregistered ASN_GW in order to register the target ASN_GW as the new FA of the SR MS with the preregistered ASN_GW, and transmitting a Path Registration Response (Path_Reg_Rsp) message to the BS in response to the Path_Reg_Req message.

In accordance with another aspect of the present invention, a method for supporting an idle mode handover of a Single Radio Mobile Station (SR MS) by a preregistered Access Service Network GateWay (ASN_GW) in a heterogeneous wireless communication system is provided. The method includes, upon receiving an Idle Mode Exit State Change Request (IM_Exit_State_Change_Req) message, indicating that an operation mode of the SR MS is to be changed from an idle mode to an active mode, from a target ASN_GW, transmitting an Idle Mode Exit State Change Response (IM_Exit_State_Change_Rsp) message, accepting to change the operation mode of the SR MS from the idle mode to the active mode and including an address of a Home Agent (HA) of the SR MS, to the target ASN_GW, upon receiving an Anchor Data Path Function Relocation Request (Anchor_DPF_Relocate_Req) message, including the address of the HA of the SR MS and requesting to set the target ASN_GW as a new Foreign Agent (FA) of the SR MS, from the target ASN_GW, transmitting an FA Registration Request (FA_Register_Req) message, requesting to register the target ASN_GW as the new FA of the SR MS, to the target ASN_GW, and receiving an FA Registration Response (FA_Register_Rsp) message for registering the target ASN_GW as the new FA of the SR MS with the preregistered ASN_GW from the target ASN_GW.

In accordance with another aspect of the present invention, a method for supporting an idle mode handover of an SR MS by a BS in a heterogeneous wireless communication system is provided. The method includes, transmitting an IM_Exit_State_Change_Req message, indicating that an operation mode of the SR MS is to be changed from an idle mode to an active mode, to a target ASN_GW, receiving an IM_Exit_State_Change_Rsp message, including an address of a HA of the SR MS, from the target ASN_GW, transmitting a Path_Reg_Req message, indicating that a path is to be set up with a preregistered ASN_GW with which the SR MS has performed a preregistration operation, to the target ASN_GW, and receiving a Path_Reg_Rsp message from the target ASN_GW in response to the Path_Reg_Req message.

In accordance with another aspect of the present invention, a target ASN_GW in a heterogeneous wireless communication system is provided. The target ASN_GW includes a controller for acquiring an address of a HA of an SR MS from a preregistered ASN_GW with which the SR MS has performed a preregistration operation when detecting that an operation mode of the SR MS is to be changed from an idle mode to an active mode, controlling a transmitter to transmit a message, including the address of the HA and requesting to set the target ASN_GW as a new FA of the SR MS, to the preregistered ASN_GW when detecting that a BS is to set up a path with the preregistered ASN_GW, and setting up a data path with the HA and then registering the target ASN_GW as the new FA of the SR MS when a receiver receives a message, requesting to register the target ASN_GW as the new FA of the SR MS, from the preregistered ASN_GW.

In accordance with yet another aspect of the present invention, a preregistered ASN_GW in a heterogeneous wireless communication system is provided. The preregistered ASN_GW includes a controller for controlling a transmitter to transmit a message, accepting to change an operation mode of a SR MS from an idle mode to an active mode and including an address of a HA of the SR MS, to a target ASN_GW to which the SR MS is to be handed over when detecting that the operation mode of the SR MS is to be changed from the idle mode to the active mode, controlling the transmitter to transmit a message, requesting to register the target ASN_GW as a new Foreign Agent (FA) of the SR MS, to the target ASN_GW when detecting that a receiver receives a message, requesting to set the target ASN_GW as the new FA of the SR MS, from the target ASN_GW, and detecting that the receiver receives a message, indicating that the target ASN_GW has been registered as the new FA of the SR MS, from the target ASN_GW In accordance with still another aspect of the present invention, a BS in a heterogeneous wireless communication system is provided. The BS includes a controller for requesting a target ASN_GW to change an operation mode of a SR MS from an idle mode to an active mode when detecting that the operation mode of the SR MS is to be changed from the idle mode to the active mode, acquiring an address of a HA of the SR MS from the target ASN_GW, setting up a path with a preregistered ASN_GW, accepting the SR MS to transition from the idle mode to the active mode, and then performing a process of updating a Cipher-based Message Authentication Code (CMAC)_KEY_COUNT with the target ASN_GW.

In accordance with still another aspect of the present invention, a target ASN_GW in a heterogeneous wireless communication system is provided. The target ASN_GW includes a transmitter and a receiver. The receiver receives an IM_Exit_State_Change_Req message, indicating that an operation mode of the SR MS is to be changed from an idle mode to an active mode, from a BS, the transmitter transmits the received IM_Exit_State_Change_Req message to a preregistered ASN_GW with which the SR MS has performed a preregistration operation. The receiver receives an IM_Exit_State_Change_Rsp message, including an address of a HA of the SR MS, from the preregistered ASN_GW. The transmitter transmits the received IM_Exit_State_Change_Rsp message to the BS, and the receiver receives a Path_Reg_Req message, indicating that a path is to be set up with the preregistered ASN_GW, from the BS. The transmitter transmits an Anchor_DPF_Relocate_Req message, including the address of the HA of the SR MS and requesting to set the target ASN_GW as a new FA of the SR MS, to the preregistered ASN_GW. The receiver receives an FA_Register_Req message, requesting to register the target ASN_GW as the new FA of the SR MS, from the preregistered ASN_GW. When the target ASN_GW has been registered as the new FA of the SR MS, the transmitter transmits an RRQ message to the HA in order to set up a data path. The receiver receives an RRP message from the HA in response to the RRQ message, and when the path has been set up with the preregistered ASN_GW, the transmitter transmits an FA_Register_Rsp message to the preregistered ASN_GW in order to register the target ASN_GW as the new FA of the SR MS with the preregistered ASN_GW. The transmitter transmits a Path_Reg_Rsp message to the BS in response to the Path_Reg_Req message.

In accordance with still another aspect of the present invention, a preregistered ASN_GW in a heterogeneous wireless communication system is provided. The preregistered ASN_GW includes a transmitter and a receiver. When the receiver receives an IM_Exit_State_Change_Req message, indicating that an operation mode of the SR MS is to be changed from an idle mode to an active mode, from a target ASN_GW, the transmitter transmits an IM_Exit_State_Change_Rsp message, accepting to change the operation mode of the SR MS from the idle mode to the active mode and including an address of an HA of the SR MS, to the target ASN_GW. When the receiver receives an Anchor_DPF_Relocate_Req message, including the address of the HA of the SR MS and requesting to set the target ASN_GW as a new FA of the SR MS, from the target ASN_GW, the transmitter transmits an FA_Register_Req message, requesting to register the target ASN_GW as the new FA of the SR MS, to the target ASN_GW. The receiver receives an FA_Register_Rsp message for registering the target ASN_GW as the new FA of the SR MS with the preregistered ASN_GW from the target ASN_GW.

In accordance with yet another aspect of the present invention, a BS in a heterogeneous wireless communication system is provided. The BS includes a transmitter and a receiver. The transmitter transmits an IM_Exit_State_Change_Req message, indicating that an operation mode of the SR MS is to be changed from an idle mode to an active mode, to a target ASN_GW. The receiver receives an IM_Exit_State_Change_Rsp message, including an address of a HA of the SR MS, from the target ASN_GW. The transmitter transmits a Path_Reg_Req message, indicating that a path is to be set up with a preregistered ASN_GW with which the SR MS has performed a preregistration operation, to the target ASN_GW. The receiver receives a Path_Reg_Rsp message from the target ASN_GW in response to the Path_Reg_Req message.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention include an idle mode handover apparatus and method in a heterogeneous wireless communication system. In particular, exemplary embodiments of the present invention include an apparatus and method for an idle mode handover of a Single Radio Mobile Station (SR MS) from a non-Worldwide Interoperability for Microwave Access (non-WiMAX) wireless communication system to a WiMAX wireless communication system. Here, the SR MS refers to an MS capable of accessing two different wireless communication systems by being provided with two radio interface units, only one of which can transmit data at a specific point of time. Although, the SR MS can transmit data through only one radio interface unit at a specific point of time, the two radio interface units of the SR MS can both always receive data at the same time. In exemplary embodiments of the present invention, an idle mode handover apparatus and method will be described on the assumption that a wireless communication system to which an SR MS is to be handed over is, for example, a WiMAX wireless communication system. However, it will be apparent to those skilled in the art that an idle mode handover apparatus and method proposed in the present invention may also be used in a case where the SR MS is to be handed over to a wireless communication system other than the WiMAX wireless communication system.

Figure 1:
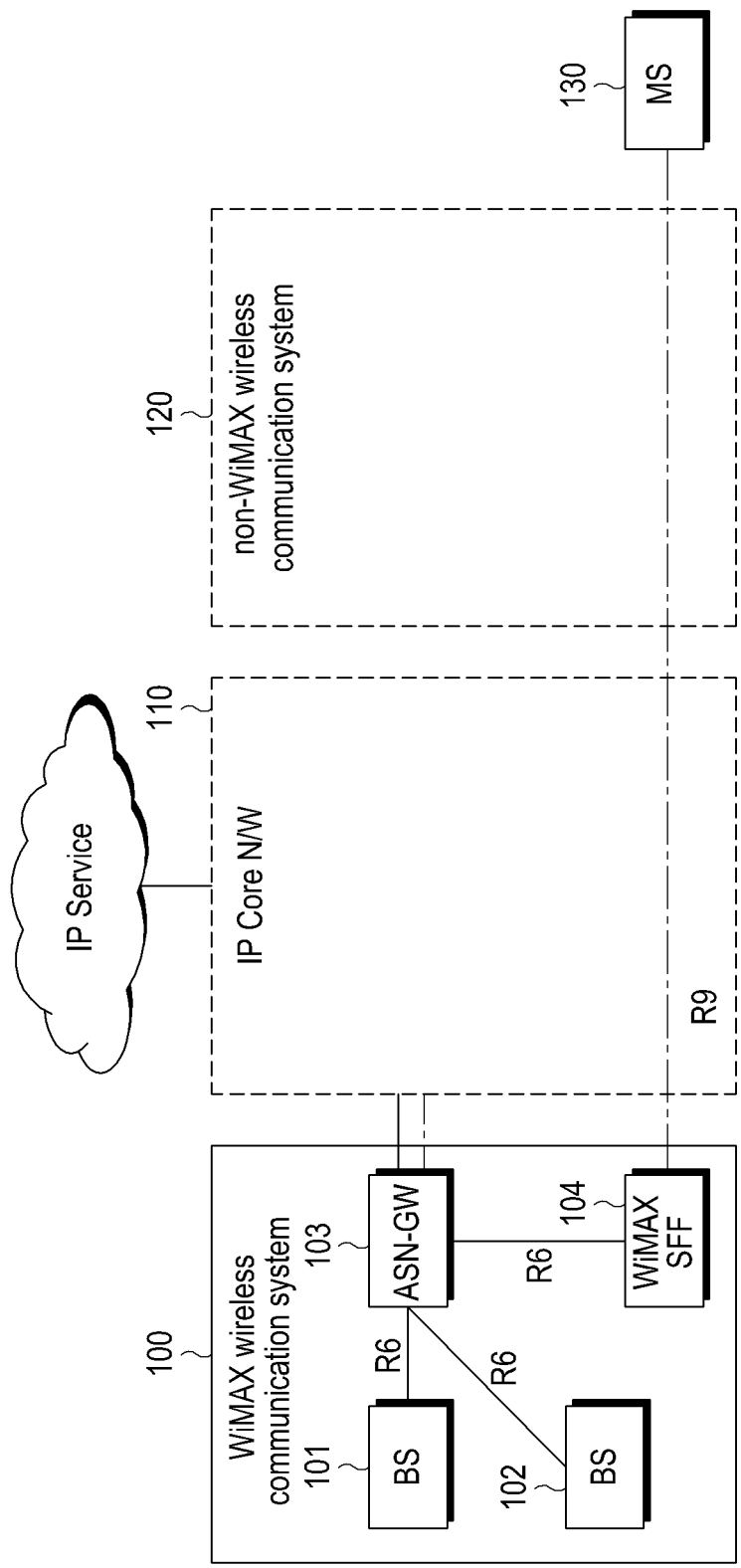
FIG. 1 is a view schematically illustrating a heterogeneous wireless communication system in accordance with an exemplary embodiment of the present invention.

FIG. 1 illustrates a heterogeneous wireless communication system according to an exemplary embodiment of the present invention.

Referring to FIG. 1, the heterogeneous wireless communication system includes a WiMAX wireless communication system 100, an Internet protocol core network (IP Core N/W) 110, a non-WiMAX wireless communication system 120, and an SR MS 130. With regard to this, it should be noted that, for the convenience of description, the SR MS 130 is simply illustrated as an MS 130 in FIG. 1.

The WiMAX wireless communication system 100 includes Base Stations (BSs) 101, 102, an Access Service Network GateWay (ASN_GW) 103, and a WiMAX Signal Forwarding Function (SFF) unit 104. Here, the ASN_GW is a control station that may include a Paging Controller (PC), an Anchor Data Path Function (ADPF) unit, a Proxy Mobile Internet Protocol (PMIP) client, an authenticator, and the like (not shown). That is, the ASN_GW 103, the PC, the ADPF unit, the PMIP client, and the authenticator may be implemented as respective separate entities or as one integrated entity. The PC manages idle mode MSs and performs a paging operation when data destined for idle mode MSs are received. The authenticator performs an authentication operation for MSs and generates security keys. In this exemplary embodiment of the present invention, it will be assumed for the convenience of description that the ASN_GW 103, the PC, the ADPF unit, the PMIP client, and the authenticator are implemented as one integrated entity.

When the SR MS 130, which is in a state of accessing the non-WiMAX wireless communication system 120, detects a signal from the WiMAX wireless communication system 100, it scans the WiMAX SFF unit 104 in order to perform a handover to the WiMAX wireless communication system 100. The SR MS 130 communicates with the WiMAX SFF unit 104 by using an R9 interface. Here, the WiMAX SFF unit 104 functions as a type of BS to connect the SR MS 103 accessing the non-WiMAX wireless communication system 120 to the WiMAX wireless communication system 100.

When the SR MS 130 discovers the WiMAX SFF unit 104, it performs a preregistration operation with the WiMAX wireless communication system 100 through the WiMAX SFF unit 104. Upon performing this preregistration operation, the SR MS 130 may be immediately handed over to the WiMAX wireless communication system 100, or may transition to an idle mode, and then transition to an active mode and be handed over to the WiMAX wireless communication system 100 later on. Here, the former (that is, the case where the SR MS 130 is handed over immediately after the preregistration operation) corresponds to an active mode handover, and the latter (that is, the case where the SR MS 130 is handed over later on after the preregistration operation) corresponds to an idle mode handover.

In the case of the idle mode handover of the SR MS 130 to the WiMAX wireless communication system 100, when the SR MS 130 in an idle mode moves from a preregistered ASN_GW to a BS connected to another ASN_GW, that is, a target ASN_GW, the target ASN_GW must be able to transmit a Mobile Internet Protocol (MIP) Registration ReQuest (RRQ) message (MIP RRQ message) to a Home Agent (HA), and must perform an authentication operation with a PMIP client in order to change a Foreign Agent (FA) of the SR MS 130 from the preregistered ASN_GW to the target ASN_GW. Here, the preregistered ASN_GW refers to an ASN_GW with which the SR MS 130 has performed a preregistration operation.

However, in WiMAX wireless communication systems of the conventional art, when an SR MS in an idle mode moves to a BS connected to a target ASN_GW other than a preregistered ASN_GW, the target ASN-GW cannot transmit an MIP RRQ message to an HA because it cannot know the address of the HA, and cannot also change an FA of the SR MS because there has been no procedure related to the PMIP authentication operation. Consequently, in WiMAX wireless communication systems of the conventional art, it has not been possible for an SR MS, which has accessed a non-WiMAX wireless communication system, to achieve an idle mode handover to a WiMAX wireless communication system.

Therefore, exemplary embodiments of the present invention include an idle mode handover method that enables an SR MS, which has accessed a non-WiMAX wireless communication system, to achieve an idle mode handover to a WiMAX wireless communication system, and an exemplary embodiment of such an idle mode handover method will be described below with reference to FIG. 2.

Figure 2:
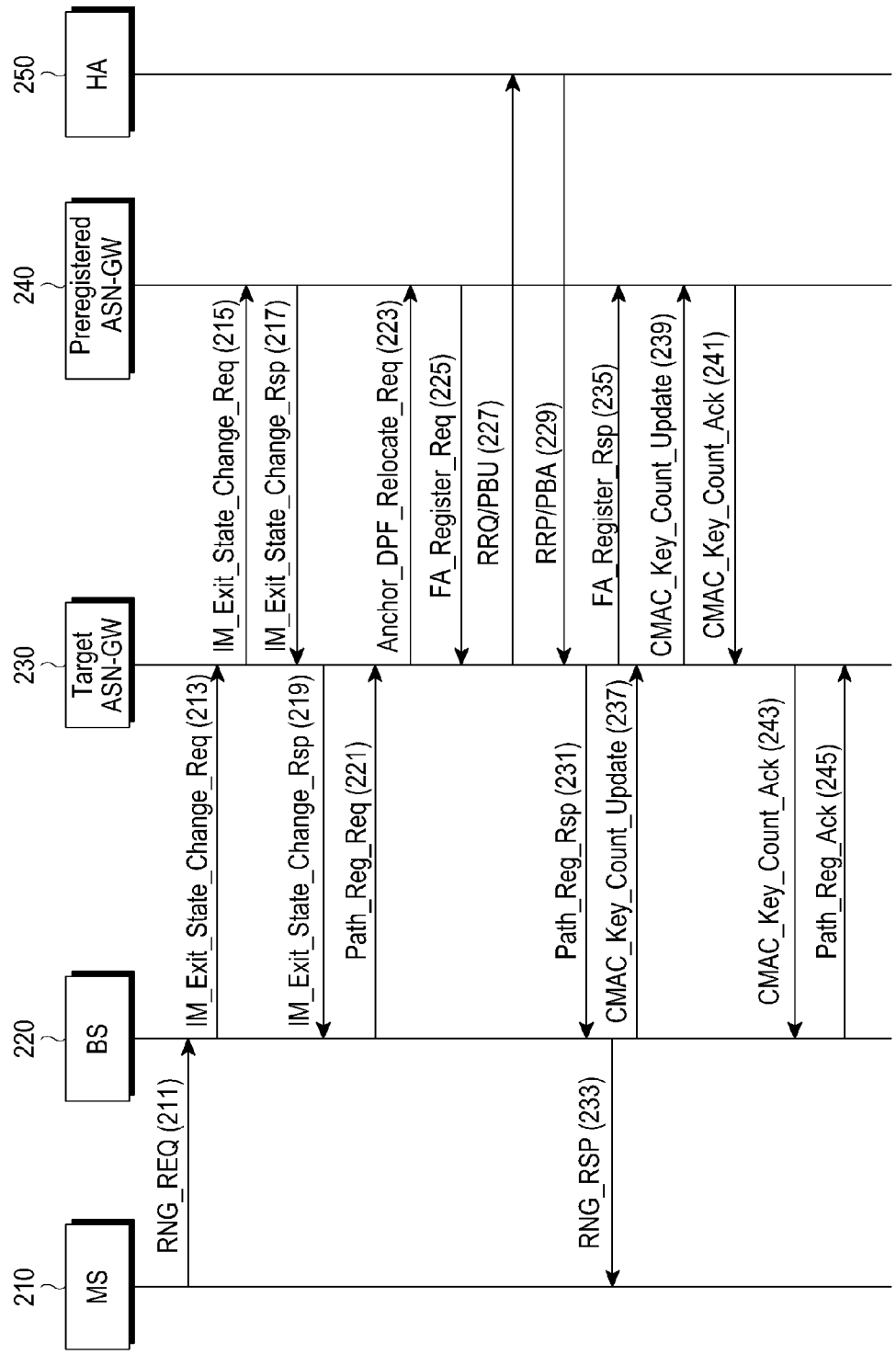
FIG. 2 is a signal flow diagram illustrating an idle mode handover method in accordance with an exemplary embodiment of the present invention.

FIG. 2 illustrates an idle mode handover method in a heterogeneous wireless communication system according to an exemplary embodiment of the present invention.

Prior to a description of FIG. 2, it will be assumed that each control station, that is, each of a target ASN_GW and a preregistered ASN_GW, is implemented as one entity in which an ASN_GW, a PC, an ADPF unit, a PMIP client, and an authenticator are incorporated. Further, it should be noted that, for the convenience of description, an SR MS 210 is illustrated as an MS 210 in FIG. 2.

Referring to FIG. 2, in order to transition from an idle mode to an active mode, the SR MS 210 transmits a RaNGing ReQuest (RNG_REQ) message to a BS 220 in step 211. Here, the SR MS 210 is an SR MS that is to be handed over from a non-WiMAX wireless communication system to a WiMAX wireless communication system. The RNG_REQ message includes a ranging purpose indication, a PC identifier, a Cipher-based Message Authentication Code (CMAC)_KEY_COUNT, and a Hashed Message Authentication Code (HMAC)/CMAC tuple.

Upon receiving the RNG_REQ message from the SR MS 210, the BS 220 transmits an Idle Mode Exit State Change Request (IM_Exit_State_Change_Req) message, which indicates that the SR MS 210 requests transition from an idle mode to an active mode, to a target ASN_GW 230 in step 213. Here, the IM_Exit_State_Change_Req message includes BS INFO that is information regarding the BS 220, and a PC Identification (ID). Upon receiving the IM_Exit_State_Change_Req message from the BS 200, the target ASN_GW 230 transmits the received IM_Exit_State_Change_Req message to a preregistered ASN_GW 240 in step 215.

Upon receiving the IM_Exit_State_Change_Req message from the target ASN_GW 230, the preregistered ASN_GW 240 accepts to change the operation mode of the SR MS 210 from an idle mode to an active mode, and transmits an Idle Mode Exit State Change Response (IM_Exit_State_Change_Rsp) message to the target ASN_GW 230 in response to the IM_Exit_State_Change_Req message in step 217. Here, the IM_Exit_State_Change_Rsp message includes an Authentication Key (AK), IDLE Retain Info, and MS Info. The IDLE Retain Info represents information regarding the idle mode operation of the SR MS 210, and the MS Info includes an Anchor ASN ID, an Authenticator ID, and an Anchor_MM_Context. The Anchor_MM_Context, which is a newly proposed parameter for informing the target ASN_GW 230 of the address of an HA 250, includes the address of the HA 250, that is, the MIP4 Info[HA IP address]. As an example, the Anchor_MM_Context may be included in the IM_Exit_State_Change_Rsp message in the form of TLV (Type, Length, Value). Further, the Anchor ASN ID represents the ID of an anchor ASN of the SR MS 210, and the Authenticator ID represents the ID of an authenticator.

As the target ASN_GW 230 receives the IM_Exit_State_Change_Rsp message from the preregistered ASN_GW 240, it can acquire the HA address of the SR MS 210. The target ASN_GW transmits the received IM_Exit_State_Change_Rsp message to the BS 220 in step 219.

Upon receiving the IM_Exit_State_Change_Rsp message from the target ASN_GW 230, the BS 220 transmits a Path Registration Request (Path_Reg_Req) message to the target ASN_GW 230 in order to set up a path with an ADPF unit in step 221. Upon receiving the Path_Reg_Req message from the BS 220, the target ASN_GW 230 transmits an ADPF Relocation Request (Anchor_DPF_Relocate_Req) message to the preregistered ASN_GW 240 in order to set the target ASN_GW 230 itself as a new FA of the SR MS 210 in step 223. The Anchor_DPF_Relocate_Req message includes an Anchor_MM_Context, and the Anchor_MM_Context includes an MS Mobility Mode (MM) and MIP4 Info. Here, the MS Mobility Mode and the MIP4 Info included in the Anchor_MM_Context are information that is used to generate a Registration ReQuest (RRQ) message in a PMIP client, the MS mobility mode represents the type of a Mobile Internet Protocol (Mobile IP), and the MIP4 Info includes the address of a source FA and the address of a target FA.

Upon receiving the Anchor_DPF_Relocate_Req message from the target ASN_GW 230, the preregistered ASN_GW 240 determines whether the address of a source FA, included in the Anchor_DPF_Relocate_Req message, is valid. If the address of the source FA is determined to be valid, the preregistered ASN_GW 240 transmits an FA Registration Request (FA_Register_Req) message requesting to register the target ASN_GW 230 as a new FA to the target ASN_GW 230 in step 225. Here, the FA_Register_Req message includes an RRQ message and MIP keys.

Upon receiving the FA_Register_Req message from the preregistered ASN_GW 240, the target ASN_GW 230 registers itself as a new FA of the SR MS 210, and transmits an RRQ/Proxy Binding Update (PBU) message to the HA 250 in order to set up a data path with the HA 250 in step 227. Upon receiving the RRQ/PBU message from the target ASN_GW 230, the HA 250 sets up a data path with the target ASN_GW 230, and then transmits a Registration ResPonse (RRP)/Proxy Binding Acknowledgement (PBA) message to the target ASN_GW 230 in response to the RRQ/PBU message in step 229.

Upon receiving the RRP/PBA message from the HA 250, the target ASN_GW 230 sets up a path with the ADPF unit, and then transmits a Path Registration Response (Path_Reg_Rsp) message to the BS 220 in response to the Path_Reg_Req message in step 231. Upon receiving the Path_Reg_Rsp message from the target ASN_GW 230, the BS 220 accepts the SR MS 210 to transition from an idle mode to an active mode, and then transmits a RaNGing ReSPonse (RNG_RSP) message to the SR MS 210 in response to the RNG_REQ message in step 233. Here, the RNG_RSP message includes a Location Update Rsp, Paging Info, a PC ID, and an HMAC/CMAC tuple. The Location Update Rsp is a message indicating that the location of the SR MS 210 has been updated, and the Paging Info represents information regarding paging of the SR MS 210.

In addition, upon transmitting the Path_Reg_Rsp message to the BS 220, the target ASN_GW 230 transmits an FA Registration Response (FA_Register_Rsp) message to the preregistered ASN_GW 240 in response to the FA_Register_Req message in order to register itself as a new FA of the SR MS 210, in step 235. Here, the FA_Register_Rsp message includes an RRP message.

Further, upon transmitting the RNG_RSP message to the SR MS 210, the BS 220 transmits a CMAC_Key_Count_Update (CMAC_Key_Count_Update) message to the target ASN_GW 230 in order to update the CMAC_KEY_COUNT in step 237. Upon receiving the CMAC_Key_Count_Update message from the BS 220, the target ASN_GW 230 transmits the received CMAC_Key_Count_Update message to the preregistered ASN_GW 240 in step 239. Upon receiving the CMAC_Key_Count_Update message from the target ASN_GW 230, the preregistered ASN_GW 240 updates the CMAC_KEY_COUNT, and then transmits a CMAC_Key_Count_Ack message to the target ASN_GW 230 in response to the CMAC_Key_Count_Update message in step 241.

Upon receiving the CMAC_Key_Count_Ack message from the preregistered ASN_GW 240, the target ASN_GW 230 transmits the received CMAC_Key_Count_Ack message to the BS 220 in step 243. Upon receiving the CMAC_Key_Count_Ack message from the target ASN_GW 230, the BS 220 transmits a Path_Reg_Ack message to the target ASN_GW 230 in response to the Path_Reg_Rsp message in step 245.

Figure 3A:
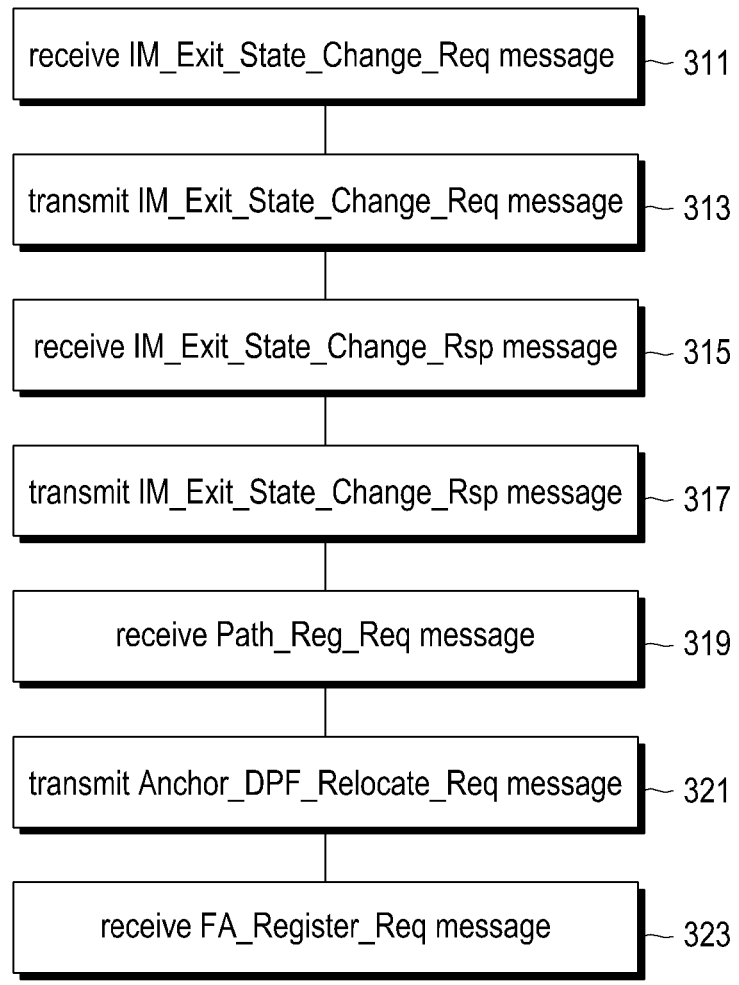
FIGS. 3A and 3B are flowcharts illustrating an operation procedure of a target Access Service Network GateWay (ASN_GW) 230 in FIG. 2 in accordance with an exemplary embodiment of the present invention.
Figure 3B:
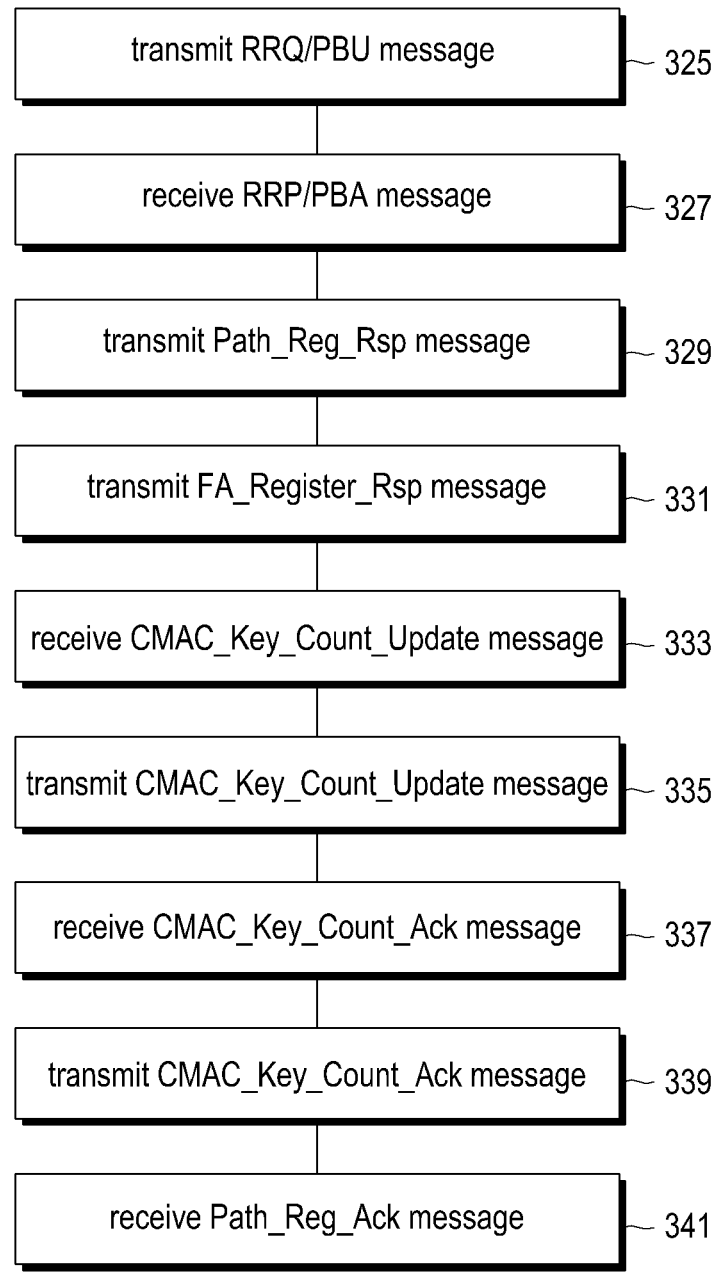

Next, reference will be made to FIGS. 3A and 3B illustrating the operation procedure of the target ASN_GW 230 in FIG. 2.

Referring to FIGS. 3A and 3B, when the target ASN_GW 230 receives an IM_Exit_State_Change_Req message from the BS 220 in step 311, it proceeds to step 313. In step 313, the target ASN_GW 230 transmits the IM_Exit_State_Change_Req message, received from the BS 220, to the preregistered ASN_GW 240, and proceeds to step 315. In step 315, the target ASN_GW 230 receives an IM_Exit_State_Change_Rsp message from the preregistered ASN_GW 240, and proceeds to step 317. In step 317, the target ASN_GW 230 transmits the IM_Exit_State_Change_Rsp message, received from the preregistered ASN_GW 240, to the BS 220, and proceeds to step 319.

In step 319, the target ASN_GW 230 receives a Path_Reg_Req message from the BS 220, and proceeds to step 321. In step 321, the target ASN_GW 230 transmits an Anchor_D-PF_Relocate_Req message to the preregistered ASN_GW 240, and proceeds to step 323. In step 323, the target ASN_GW 230 receives an FA_Register_Req message from the preregistered ASN_GW 240, and proceeds to step 325. In step 325, the target ASN_GW 230 transmits an RRQ/PBU message to the HA 250, and proceeds to step 327. In step 327, the target ASN_GW 230 receives an RRP/PBA message from the HA 250, and proceeds to step 329. In step 329, the target ASN_GW 230 transmits a Path_Reg_Rsp message to the BS 220, and proceeds to step 331.

In step 331, the target ASN_GW 230 transmits an FA_Register_Rsp message to the preregistered ASN_GW 240, and proceeds to step 333. In step 333, the target ASN_GW 230 receives a CMAC_Key_Count_Update message from the BS 220, and proceeds to step 335. In step 335, the target ASN_GW 230 transmits the received CMAC_Key_Count_Update message to the preregistered ASN_GW 240, and proceeds to step 337. In step 337, the target ASN_GW 230 receives a CMAC_Key_Count_Ack message from the preregistered ASN_GW 240, and proceeds to step 339. In step 339, the target ASN_GW 230 transmits the received CMAC_Key_Count_Ack message to the BS 220, and proceeds to step 341. In step 341, the target ASN_GW 230 receives a Path_Reg_Ack message from the BS 220.

Figure 4:
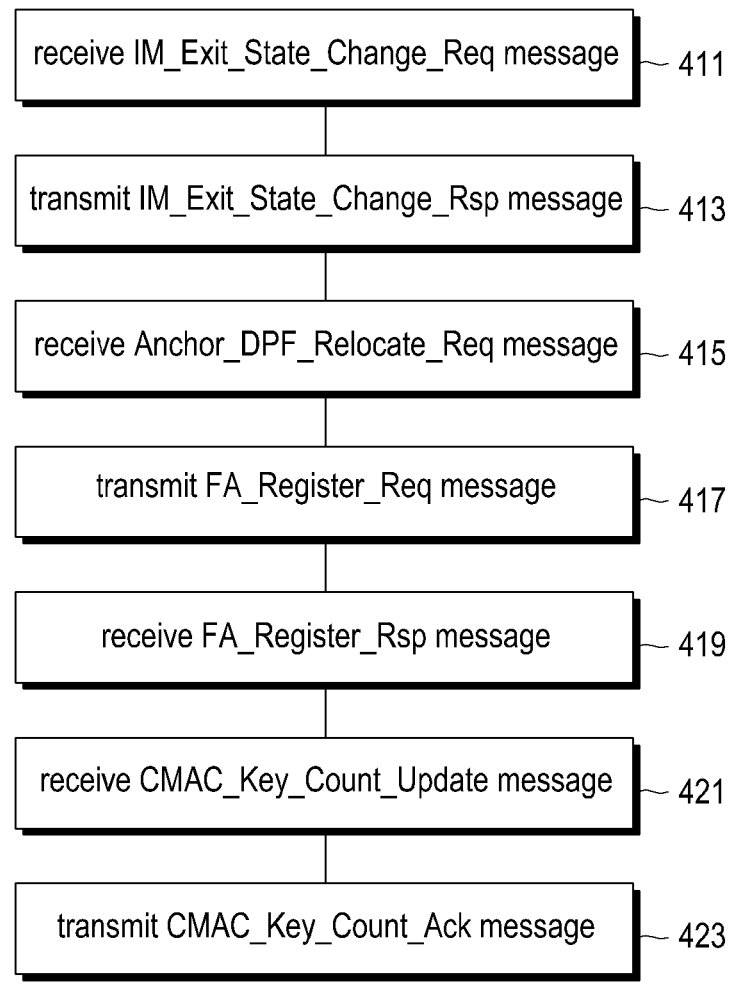
FIG. 4 is a flowchart illustrating an operation procedure of a preregistered ASN_GW 240 in FIG. 2 in accordance with an exemplary embodiment of the present invention.

Next, reference will be made to FIG. 4 illustrating the operation procedure of the preregistered ASN_GW 240 in FIG. 2.

Referring to FIG. 4, in step 411, the preregistered ASN_GW 240 receives an IM_Exit_State_Change_Req message from the target ASN_GW 230, and proceeds to step 413. In step 413, the preregistered ASN_GW 240 transmits an IM_Exit_State_Change_Rsp message to the target ASN_GW 230, and proceeds to step 415. In step 415, the preregistered ASN_GW 240 receives an Anchor_DPF_Relocate_Req message from the target ASN_GW 230, and proceeds to step 417. In step 417, the preregistered ASN_GW 240 transmits an FA_Register_Req message to the target ASN_GW 230, and proceeds to step 419. In step 419, the preregistered ASN_GW 240 receives an FA_Register_Rsp message from the target ASN_GW 230, and proceeds to step 421. In step 421, the preregistered ASN_GW 240 transmits a CMAC_Key_Count_Update message from the target ASN_GW 230, and proceeds to step 423. In step 423, the preregistered ASN_GW 240 transmits a CMAC_Key_Count_Ack message to the target ASN_GW 230.

Figure 5:
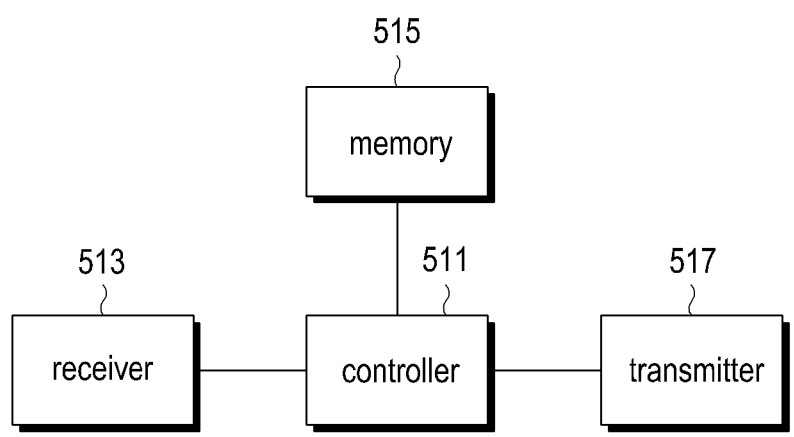
FIG. 5 is a block diagram illustrating an internal structure of an ASN_GW in a WiMAX wireless communication system in accordance with an exemplary embodiment of the present invention.

Next, reference will be made to FIG. 5 illustrating the internal structure of an ASN_GW in a WiMAX wireless communication system according to an exemplary embodiment of the present invention.

Referring to FIG. 5, the ASN_GW includes a controller 511, a receiver 513, a memory 515, and a transmitter 517. The controller 511 controls the overall operation of the ASN_GW. In particular, when the ASN_GW is a target ASN_GW, the controller 511 controls the ASN_GW to perform the operation as described in FIGS. 2 and 3. Further, when the ASN_GW is a preregistered ASN_GW, the controller 511 controls the ASN_GW to perform the operation as described in FIGS. 2 and 4. The operation of the ASN_GW as a target ASM GW and the operation of the ASN_GW as a preregistered ASN_GW have been already described above in detail, so a detailed description thereof will be omitted here.

The memory 515 stores various data necessary for the ASN_GW to perform the above operations, the receiver 513 receives messages from external entities, such a BS and an HA, and the transmitter 517 transmits messages to external entities, such as a BS and an HA.

As described above, the present invention enables an idle mode handover of an SR MS in a heterogeneous wireless communication system. In particular, exemplary embodiments of the present invention make it possible for an SR MS, which has accessed a non-WiMAX wireless communication system, to perform an idle mode handover to a WiMAX wireless communication system, thereby improving service quality.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for supporting an idle mode handover of a Single Radio Mobile Station (SR MS) by a target Access Service Network GateWay (ASN_GW) in a heterogeneous wireless communication system, the method comprising:

upon detecting that an operation mode of the SR MS is to be changed from an idle mode to an active mode, acquiring an address of a Home Agent (HA) of the SR MS from a preregistered ASN_GW with which the SR MS has performed a preregistration operation;

upon detecting that a Base Station (BS) is to set up a path with the preregistered ASN_GW, transmitting a message, including the address of the HA and requesting to set the target ASN_GW as a new Foreign Agent (FA) of the SR MS, to the preregistered ASN_GW; and upon receiving a message, requesting to register the target ASN_GW as the new FA of the SR MS, from the preregistered ASN_GW, setting up a data path with the HA, and then registering the target ASN_GW as the new FA of the SR MS.

2. The method as claimed in claim 1, wherein the acquiring of the address of the HA of the SR MS from the preregistered ASN_GW comprises:

transmitting a message, requesting to change the operation mode of the SR MS from the idle mode to the active mode, to the preregistered ASN_GW;

receiving a message, indicating that changing the operation mode of the SR MS from the idle mode to the active mode is accepted and including the address of the HA of the SR MS, from the preregistered ASN_GW.

3. The method as claimed in claim 1, wherein the message requesting to register the target ASN_GW as the new FA of the SR MS, received from the preregistered ASN_GW, includes a registration request message used when the target ASN_GW registers the target ASN_GW as the new FA of the SR MS with the preregistered ASN_GW.

4. The method as claimed in claim 3, wherein the registering of the target ASN_GW as the new FA of the SR MS comprises including a registration response message in a response message, and transmitting the response message with the registration response message included therein to the preregistered ASN_GW in response to the message requesting to register the target ASN_GW as the new FA of the SR MS, received from the preregistered ASN_GW.

5. The method as claimed in claim 1, further comprising:
upon receiving a message, indicating that a Cipher-based Message Authentication Code (CMAC)_KEY_COUNT is to be updated, from the BS after registering the target ASN_GW as the new FA of the SR MS, transmitting a message, requesting to update the CMAC_KEY_COUNT to the preregistered ASN_GW; and
upon receiving a message, indicating that the CMAC_KEY_COUNT has been updated, from the preregistered ASN_GW, transmitting the message, indicating that the CMAC_KEY_COUNT has been updated, to the BS.

6. A method for supporting an idle mode handover of a Single Radio Mobile Station (SR MS) by a preregistered Access Service Network GateWay (ASN_GW) in a heterogeneous wireless communication system, the method comprising:
upon detecting that an operation mode of the SR MS is to be changed from an idle mode to an active mode, transmitting a message, accepting to change the operation mode of the SR MS from the idle mode to the active mode and including an address of a Home Agent (HA) of the SR MS, to a target ASN_GW to which the SR MS is to be handed over;
upon receiving a message, requesting to set the target ASN_GW as a new Foreign Agent (FA) of the SR MS, from the target ASN_GW, transmitting a message, requesting to register the target ASN_GW as the new FA of the SR MS, to the target ASN_GW; and
receiving a message, indicating that the target ASN_GW has been registered as the new FA of the SR MS, from the target ASN_GW.

7. The method as claimed in claim 6, wherein the message requesting to register the target ASN_GW as the new FA of the SR MS includes a registration request message used when the target ASN_GW registers the target ASN_GW as the new FA of the SR MS with the preregistered ASN_GW.

8. The method as claimed in claim 7, wherein the message indicating that the target ASN_GW has been registered as the new FA of the SR MS includes a registration response message that is in response to the registration request message.

9. The method as claimed in claim 6, further comprising:
receiving a message, requesting to update a Cipher-based Message Authentication Code (CMAC)_KEY_COUNT, from the target ASN_GW; and
updating the CMAC_KEY_COUNT, and then transmitting a message, indicating that the CMAC_KEY_COUNT has been updated, to the target ASN_GW.

10. A method for supporting an idle mode handover of a Single Radio Mobile Station (SR MS) by a Base Station (BS) in a heterogeneous wireless communication system, the method comprising:
upon detecting that an operation mode of the SR MS is to be changed from the idle mode to an active mode, requesting a target Access Service Network GateWay (ASN_GW) to change an operation mode of the SR MS from the idle mode to the active mode;
acquiring an address of a Home Agent (HA) of the SR MS from the target ASN_GW;
setting up a path with a preregistered ASN_GW; and
after setting up the path with the preregistered ASN_GW, accepting the SR MS to transition from the idle mode to the active mode, and then performing a process of updating a cipher-based message authentication code (CMAC)_KEY_COUNT with the target ASN_GW.

11. The method as claimed in claim 10, wherein the setting up of the path with the preregistered ASN_GW comprises:
transmitting a registration request message for setting up the path with the preregistered ASN_GW to the target ASN_GW; and
receiving a response message from the target ASN_GW in response to the registration request message.

12. The method as claimed in claim 10, wherein the updating of the CMAC_KEY_COUNT with the target ASN_GW comprises:
transmitting a message, indicating that the CMAC_KEY_COUNT is to be updated, to the target ASN_GW; and
receiving a message, indicating that the CMAC_KEY_COUNT has been updated, from the target ASN_GW.

13. A method for supporting an idle mode handover of a Single Radio Mobile Station (SR MS) by a target Access Service Network GateWay (ASN_GW) in a heterogeneous wireless communication system, the method comprising:
upon receiving an Idle Mode Exit State Change Request (IM_Exit_State_Change_Req) message, indicating that an operation mode of the SR MS is to be changed from an idle mode to an active mode, from a Base Station (BS), transmitting the received IM_Exit_State_Change_Req message to a preregistered ASN_GW with which the SR MS has performed a preregistration operation;
receiving an Idle Mode Exit State Change Response (IM_Exit_State_Change_Rsp) message, including an address of a Home Agent (HA) of the SR MS, from the preregistered ASN_GW;
transmitting the received IM_Exit_State_Change_Rsp message to the BS, and receiving a Path Registration Request (Path_Reg_Req) message, indicating that a path is to be set up with the preregistered ASN_GW, from the BS;
transmitting an Anchor Data Path Function Relocation Request (Anchor_DPF_Relocate_Req) message, including the address of the HA of the SR MS and requesting to set the target ASN_GW as a new Foreign Agent (FA) of the SR MS, to the preregistered ASN_GW;
receiving an FA Registration Request (FA_Register_Req) message, requesting to register the target ASN_GW as the new FA of the SR MS, from the preregistered ASN_GW;
registering the target ASN_GW as the new FA of the SR MS, and then transmitting a Registration ReQuest (RRQ) message to the HA in order to set up a data path;
upon receiving a Registration ResPonse (RRP) message from the HA in response to the RRQ message, setting up the path with the preregistered ASN_GW, and then transmitting an FA Registration Response (FA_Register_Rsp) message to the preregistered ASN_GW in order to register the target ASN_GW as the new FA of the SR MS with the preregistered ASN_GW; and
transmitting a Path Registration Response (Path_Reg_Rsp) message to the BS in response to the Path_Reg_Req message.

14. The method as claimed in claim 13, further comprising:
receiving a Cipher-based Message Authentication Code (CMAC)_Key_Count Update (CMAC_Key_Count_Update) message, indicating that a CMAC_KEY_COUNT is to be updated, from the BS;
transmitting the received CMAC_Key_Count_Update message to the preregistered ASN_GW;
upon receiving a CMAC_Key_Count Acknowledgement (CMAC_Key_Count_Ack) message, indicating that the CMAC_KEY_COUNT has been updated, from the preregistered ASN_GW, transmitting the received CMAC_Key_Count_Ack message to the BS; and receiving a Path Registration Acknowledgement (Path_Reg_Ack) message from the BS in response to the Path_Reg_Rsp message.

15. A method for supporting an idle mode handover of a Single Radio Mobile Station (SR MS) by a preregistered Access Service Network GateWay (ASN_GW) in a heterogeneous wireless communication system, the method comprising:

upon receiving an Idle Mode Exit State Change Request (IM_Exit_State_Change_Req) message, indicating that an operation mode of the SR MS is to be changed from an idle mode to an active mode, from a target ASN_GW, transmitting an Idle Mode Exit State Change Response (IM_Exit_State_Change_Rsp) message, accepting to change the operation mode of the SR MS from the idle mode to the active mode and including an address of a Home Agent (HA) of the SR MS, to the target ASN_GW;

upon receiving an Anchor Data Path Function Relocation Request (Anchor_DPF_Relocate_Req) message, including the address of the HA of the SR MS and requesting to set the target ASN_GW as a new Foreign Agent (FA) of the SR MS, from the target ASN_GW, transmitting an FA Registration Request (FA_Register_Req) message, requesting to register the target ASN_GW as the new FA of the SR MS, to the target ASN_GW; and receiving an FA Registration Response (FA_Register_Rsp) message for registering the target ASN_GW as the new FA of the SR MS with the preregistered ASN_GW from the target ASN_GW.

16. The method as claimed in claim 15, further comprising:

receiving a Cipher-based Message Authentication Code (CMAC)_Key_Count Update (CMAC_Key_Count_Update) message, indicating that CMAC_KEY_COUNT is to be updated, from the target ASN_GW; and updating the CMAC_KEY_COUNT, and then transmitting a CMAC_Key_Count Acknowledgement (CMAC_Key_Count_Ack) message, indicating that the CMAC_KEY_COUNT has been updated, to the target ASN_GW.

17. A method for supporting an idle mode handover of a Single Radio Mobile Station (SR MS) by a Base Station (BS) in a heterogeneous wireless communication system, the method comprising:

transmitting an Idle Mode Exit State Change Request (IM_Exit_State_Change_Req) message, indicating that an operation mode of the SR MS is to be changed from an idle mode to an active mode, to a target Access Service Network GateWay (ASN_GW);

receiving an Idle Mode Exit State Change Response (IM_Exit_State_Change_Rsp) message, including an address of a Home Agent (HA) of the SR MS, from the target ASN_GW;

transmitting a Path Registration Request (Path_Reg_Req) message, indicating that a path is to be set up with a preregistered ASN_GW with which the SR MS has performed a preregistration operation, to the target ASN_GW; and receiving a Path Registration Response (Path_Reg_Rsp) message from the target ASN_GW in response to the Path_Reg_Req message.

18. The method as claimed in claim 17, further comprising:

transmitting a Cipher-based Message Authentication Code (CMAC)_Key_Count Update (CMAC_Key_Count_Update) message, indicating that a CMAC_KEY_COUNT is to be updated, to the target ASN_GW;

receiving a CMAC_Key_Count Acknowledgement (CMAC_Key_Count_Ack) message, indicating that the CMAC_KEY_COUNT has been updated, from the target ASN_GW; and transmitting a Path Registration Acknowledgement (Path_Reg_Ack) message to the target ASN_GW in response to the Path_Reg_Rsp message.

19. A target Access Service Network GateWay (ASN_GW) in a heterogeneous wireless communication system, the target ASN_GW comprising:

a controller for acquiring an address of a Home Agent (HA) of a Single Radio Mobile Station (SR MS) from a preregistered ASN_GW with which the SR MS has performed a preregistration operation when detecting that an operation mode of the SR MS is to be changed from an idle mode to an active mode, for controlling a transmitter to transmit a message, including the address of the HA and requesting to set the target ASN_GW as a new Foreign Agent (FA) of the SR MS, to the preregistered ASN_GW when detecting that a Base Station (BS) is to set up a path with the preregistered ASN_GW, and for setting up a data path with the HA and then registering the target ASN_GW as the new FA of the SR MS when a receiver receives a message, requesting to register the target ASN_GW as the new FA of the SR MS, from the preregistered ASN_GW.

20. The target ASN_GW as claimed in claim 19, wherein the transmitter transmits a message, requesting to change the operation mode of the SR MS from the idle mode to the active mode, to the preregistered ASN_GW under a control of the controller, and wherein the receiver receives a message, indicating that changing the operation mode of the SR MS from the idle mode to the active mode is accepted and including the address of the HA of the SR MS, from the preregistered ASN_GW.

21. The target ASN_GW as claimed in claim 19, wherein the message requesting to register the target ASN_GW as the new FA of the SR MS, received from the preregistered ASN_GW, includes a registration request message used when the target ASN_GW registers the target ASN_GW as the new FA of the SR MS with the preregistered ASN_GW.

22. The target ASN_GW as claimed in claim 21, wherein the transmitter includes a registration response message in a response message, and transmits the response message with the registration response message included therein to the preregistered ASN_GW in response to the message requesting to register the target ASN_GW as the new FA of the SR MS, received from the preregistered ASN_GW, under control of the controller.

23. The target ASN_GW as claimed in claim 19, wherein the receiver receives a message, indicating that a Cipher-based Message Authentication Code (CMAC)_KEY_COUNT is to be updated, from the BS, and receives a message, indicating that the CMAC_KEY_COUNT has been updated, from the preregistered ASN_GW, and wherein the transmitter transmits a message, requesting to update the CMAC_KEY_COUNT, to the preregistered ASN_GW, and transmits the message, indicating that the CMAC_KEY_COUNT has been updated, to the BS.

24. A preregistered Access Service Network GateWay (ASN_GW) in a heterogeneous wireless communication system, the preregistered ASN_GW comprising:

a controller for controlling a transmitter to transmit a message, accepting to change an operation mode of a Single Radio Mobile Station (SR MS) from an idle mode to an active mode and including an address of a Home Agent (HA) of the SR MS, to a target ASN_GW to which the SR MS is to be handed over when detecting that the operation mode of the SR MS is to be changed from the idle mode to the active mode, for controlling the transmitter to transmit a message, requesting to register the target ASN_GW as a new Foreign Agent (FA) of the SR MS, to the target ASN_GW when detecting that a receiver receives a message, requesting to set the target ASN_GW as the new FA of the SR MS, from the target ASN_GW, and for detecting that the receiver receives a message, indicating that the target ASN_GW has been registered as the new FA of the SR MS, from the target ASN_GW.

25. The preregistered ASN_GW as claimed in claim 24, wherein the message requesting to register the target ASN_GW as the new FA of the SR MS includes a registration request message used when the target ASN_GW registers the target ASN_GW as the new FA of the SR MS with the preregistered ASN_GW.

26. The preregistered ASN_GW as claimed in claim 25, wherein the message indicating that the target ASN_GW has been registered as the new FA of the SR MS includes a registration response message that is in response to the registration request message.

27. The preregistered ASN_GW as claimed in claim 26, wherein the receiver receives a message, requesting to update a Cipher-based Message Authentication Code (CMAC)_KEY_COUNT from the target ASN_GW;
the controller updates the CMAC_KEY_COUNT according to the received message requesting to update the CMAC_KEY_COUNT; and
the transmitter transmits a message, indicating that the CMAC_KEY_COUNT has been updated, to the target ASN_GW.

28. A Base Station (BS) in a heterogeneous wireless communication system, the BS comprising:
a controller for requesting a target Access Service Network GateWay (ASN_GW) to change an operation mode of a Single Radio Mobile Station (SR MS) from an idle mode to an active mode when detecting that the operation mode of the SR MS is to be changed from the idle mode to the active mode, for acquiring an address of a Home Agent (HA) of the SR MS from the target ASN_GW, for setting up a path with a preregistered ASN_GW, for accepting the SR MS to transition from the idle mode to the active mode, and then for performing a process of updating a Cipher-based Message Authentication Code (CMAC)_KEY_COUNT with the target ASN_GW.

29. The BS as claimed in claim 28, further comprising:
a transmitter for transmitting a registration request message for setting up the path with the preregistered ASN_GW to the target ASN_GW; and
a receiver for receiving a response message from the target ASN_GW in response to the registration request message.

30. The BS as claimed in claim 29, wherein the transmitter transmits a message, indicating that the CMAC_KEY_COUNT is to be updated, to the target ASN_GW, and
wherein the receiver receives a message, indicating that the CMAC_KEY_COUNT has been updated, from the target ASN_GW.

31. A target Access Service Network GateWay (ASN_GW) in a heterogeneous wireless communication system, the target ASN_GW comprising:
a transmitter; and
a receiver,
wherein the receiver receives an Idle Mode Exit State Change Request (IM_Exit_State_Change_Req) message, indicating that an operation mode of the SR MS is to be changed from an idle mode to an active mode, from a Base Station (BS), the transmitter transmits the received IM_Exit_State_Change_Req message to a preregistered ASN_GW with which the SR MS has performed a preregistration operation,
wherein the receiver receives an Idle Mode Exit State Change Response (IM_Exit_State_Change_Rsp) message, including an address of a Home Agent (HA) of the SR MS, from the preregistered ASN_GW,
wherein the transmitter transmits the received IM_Exit_State_Change_Rsp message to the BS, and the receiver receives a Path Registration Request (Path_Reg_Req) message, indicating that a path is to be set up with the preregistered ASN_GW, from the BS,
wherein the transmitter transmits an Anchor Data Path Function Relocation Request (Anchor_DPF_Relocate_Req) message, including the address of the HA of the SR MS and requesting to set the target ASN_GW as a new Foreign Agent (FA) of the SR MS, to the preregistered ASN_GW,
wherein the receiver receives an FA Registration Request (FA_Register_Req) message, requesting to register the target ASN_GW as the new FA of the SR MS, from the preregistered ASN_GW,
wherein when the target ASN_GW has been registered as the new FA of the SR MS, the transmitter transmits a Registration ReQuest (RRQ) message to the HA in order to set up a data path,
wherein the receiver receives a Registration ResPonse (RRP) message from the HA in response to the RRQ message, and when the path has been set up with the preregistered ASN_GW, the transmitter transmits an FA Registration Response (FA_Register_Rsp) message to the preregistered ASN_GW in order to register the target ASN_GW as the new FA of the SR MS with the preregistered ASN_GW, and
wherein the transmitter transmits a Path Registration Response (Path_Reg_Rsp) message to the BS in response to the Path_Reg_Req message.

32. The target ASN_GW as claimed in claim 31, wherein the receiver receives a Cipher-based Message Authentication Code (CMAC)_Key_Count Update (CMAC_Key_Count_Update) message, indicating that a CMAC_KEY_COUNT is to be updated, from the BS,
wherein the transmitter transmits the received CMAC_Key_Count_Update message to the preregistered ASN_GW, and
wherein when the receiver receives a CMAC_Key_Count Acknowledgement (CMAC_Key_Count_Ack) message, indicating that the CMAC_KEY_COUNT has been updated, from the preregistered ASN_GW, the transmitter transmits the received CMAC_Key_Count_Ack message to the BS, and
wherein the receiver receives a Path Registration Acknowledgement (Path_Reg_Ack) message from the BS in response to the Path_Reg_Rsp message.

33. A preregistered Access Service Network GateWay (ASN_GW) in a heterogeneous wireless communication system, the preregistered ASN_GW comprising:

a transmitter; and
a receiver,
wherein when the receiver receives an Idle Mode Exit State Change Request (IM_Exit_State_Change_Req) message, indicating that an operation mode of the SR MS is to be changed from an idle mode to an active mode, from a target ASN_GW, the transmitter transmits an Idle Mode Exit State Change Response (IM_Exit_State_Change_Rsp) message, accepting to change the operation mode of the SR MS from the idle mode to the active mode and including an address of a Home Agent (HA) of the SR MS, to the target ASN_GW, wherein when the receiver receives an Anchor Data Path Function Relocation Request (Anchor_DPF_Relocate_Req) message, including the address of the HA of the SR MS and requesting to set the target ASN_GW as a new Foreign Agent (FA) of the SR MS, from the target ASN_GW, the transmitter transmits an FA Registration Request (FA_Register_Req) message, requesting to register the target ASN_GW as the new FA of the SR MS, to the target ASN_GW, and wherein the receiver receives an FA Registration Response (FA_Register_Rsp) message for registering the target ASN_GW as the new FA of the SR MS with the preregistered ASN_GW from the target ASN_GW.

34. The preregistered ASN_GW as claimed in claim 33, wherein the receiver receives a Cipher-based Message Authentication Code (CMAC)_Key_Count Update (CMAC_Key_Count_Update) message, indicating that a CMAC_KEY_COUNT is to be updated, from the target ASN_GW, and wherein when the CMAC_KEY_COUNT has been updated, the transmitter transmits a CMAC_Key_Count Acknowledgement (CMAC_Key_Count_Ack) message, indicating that the CMAC_KEY_COUNT has been updated, to the target ASN_GW.

35. A Base Station (BS) in a heterogeneous wireless communication system, the BS comprising:
a transmitter; and
a receiver,
wherein the transmitter transmits an Idle Mode Exit State Change Request (IM_Exit_State_Change_Req) message, indicating that an operation mode of the SR MS is to be changed from an idle mode to an active mode, to a target Access Service Network GateWay (ASN_GW),
wherein the receiver receives an Idle Mode Exit State Change Response (IM_Exit_State_Change_Rsp) message, including an address of a Home Agent (HA) of the SR MS, from the target ASN_GW,
wherein the transmitter transmits a Path Registration Request (Path_Reg_Req) message, indicating that a path is to be set up with a preregistered ASN_GW with which the SR MS has performed a preregistration operation, to the target ASN_GW, and wherein the receiver receives a Path Registration Response (Path_Reg_Rsp) message from the target ASN_GW in response to the Path_Reg_Req message.

36. The BS as claimed in claim 35, wherein the transmitter transmits a Cipher-based Message Authentication Code (CMAC)_Key_Count Update (CMAC_Key_Count_Update) message, indicating that a CMAC_KEY_COUNT is to be updated, to the target ASN_GW,
wherein the receiver receives a CMAC_Key_Count Acknowledgement (CMAC_Key_Count_Ack) message, indicating that the CMAC_KEY_COUNT has been updated, from the target ASN_GW, and
wherein the transmitter transmits a Path Registration Acknowledgement (Path_Reg_Ack) message to the target ASN_GW in response to the Path_Reg_Rsp message.

* * * * *